United States Patent
Chanclon et al.

(10) Patent No.: US 10,730,237 B2
(45) Date of Patent: Aug. 4, 2020

(54) GENERATING A THREE-DIMENSIONAL OBJECT

(71) Applicant: Hewlett-Packard Development Company, L.P., Houston, TX (US)

(72) Inventors: David Chanclon, Sant Cugat del Valles (ES); Alejandro Manuel De Pena, Sant Cugat del Valles (ES); Esteve Comas, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/789,830

(22) Filed: Oct. 20, 2017

(65) Prior Publication Data

US 2018/0036947 A1 Feb. 8, 2018

Related U.S. Application Data

(63) Continuation of application No. 15/324,944, filed as application No. PCT/EP2014/064870 on Jul. 10, (Continued)

(51) Int. Cl.
*B29C 67/00* (2017.01)
*B29C 64/20* (2017.01)
(Continued)

(52) U.S. Cl.
CPC .............. *B29C 64/20* (2017.08); *B29C 64/00* (2017.08); *B29C 64/165* (2017.08); (Continued)

(58) Field of Classification Search
CPC ..... B29C 64/209; B29C 64/20; B29C 64/205; B29C 64/386; B33Y 50/02; B33Y 30/00; B33Y 10/00; B33Y 40/00
See application file for complete search history.

(56) References Cited

U.S. PATENT DOCUMENTS 6,136,948 A 10/2000 Dickens, Jr. et al.
6,259,962 B1 7/2001 Gothait
(Continued)

FOREIGN PATENT DOCUMENTS

EP 1452298 9/2004
EP 1648686 A1 4/2006
(Continued)

OTHER PUBLICATIONS

Tochimoto et al., JP 2001-334581 A, machine translation (Year: 2001).*
(Continued)

*Primary Examiner* — Galen H Hauth
(74) *Attorney, Agent, or Firm* — HP Inc. Patent Department

(57) ABSTRACT

According to one example, there is provided a system for generating a three-dimensional object. The system comprises a carriage to move bi-directionally along a first axis relative to a support platform. The carriage is to receive, or have installed thereon, a plurality of modules each to perform an operation from a set of operations to generate a layer of a three-dimensional object. The system further comprises a controller to cause relative movement between the carriage and the support platform along the first axis, and to control, during the relative movement, operation of the modules to perform the set of operations in a predefined order.

19 Claims, 5 Drawing Sheets

Related U.S. Application Data 2014, which is a continuation-in-part of application No. PCT/EP2014/050841, filed on Jan. 16, 2014.

(51) Int. Cl.

| | |
|---|---|
| *B29C 64/40* | (2017.01) |
| *B29C 64/00* | (2017.01) |
| *B29C 64/165* | (2017.01) |
| *B33Y 10/00* | (2015.01) |
| *B33Y 30/00* | (2015.01) |
| *B33Y 40/00* | (2020.01) |
| *B33Y 50/02* | (2015.01) |
| *B29C 64/386* | (2017.01) |
| *B29C 64/205* | (2017.01) |

(52) U.S. Cl.
CPC .......... *B29C 64/205* (2017.08); *B29C 64/386* (2017.08); *B29C 64/40* (2017.08); *B33Y 10/00* (2014.12); *B33Y 30/00* (2014.12); *B33Y 40/00* (2014.12); *B33Y 50/02* (2014.12)

(56) References Cited

U.S. PATENT DOCUMENTS

| | | | |
|---|---|---|---|
| 6,799,959 | B1 | 10/2004 | Tochimoto et al. |
| 6,896,839 | B2 * | 5/2005 | Kubo .................... B29C 64/153 264/109 |
| 7,708,929 | B2 | 5/2010 | Monsheimer et al. |
| 8,047,251 | B2 | 11/2011 | Khoshnevis |
| 8,545,209 | B2 | 10/2013 | Shi et al. |
| 9,481,162 | B2 * | 11/2016 | Okamoto ............. C09D 11/322 |
| 2002/0105114 | A1 | 8/2002 | Kubo et al. |
| 2002/0129485 | A1 | 9/2002 | Mok et al. |
| 2006/0091842 | A1 | 8/2006 | Nishiyama |
| 2006/0192315 | A1 * | 8/2006 | Farr ....................... B33Y 50/02 264/113 |
| 2007/0238056 | A1 | 10/2007 | Baumann et al. |
| 2007/0241482 | A1 | 10/2007 | Giller et al. |
| 2008/0241404 | A1 * | 10/2008 | Allaman .............. B29C 64/165 427/333 |
| 2010/0244333 | A1 | 9/2010 | Bedal et al. |
| 2013/0040091 | A1 * | 2/2013 | Dikovsky ............ B29C 64/386 428/68 |
| 2013/0105447 | A1 | 5/2013 | Haake |
| 2014/0065194 | A1 | 3/2014 | Yoo et al. |
| 2015/0258733 | A1 * | 9/2015 | Okamoto .............. B33Y 10/00 428/413 |

FOREIGN PATENT DOCUMENTS

| | | | | |
|---|---|---|---|---|
| EP | 1737646 | A1 | 1/2007 | |
| JP | 2001334581 | A * | 12/2001 | ............ B33Y 30/00 |
| WO | WO-96/06881 | A2 | 3/1996 | |
| WO | WO-01/38061 | A1 | 5/2001 | |
| WO | WO-2006/091842 | A1 | 8/2006 | |
| WO | WO-2008/151063 | | 12/2008 | |
| WO | WO-2013021173 | | 2/2013 | |
| WO | WO-2013/030064 | | 3/2013 | |
| WO | WO-2013092757 | | 6/2013 | |
| WO | WO-2014074947 | | 5/2014 | |

OTHER PUBLICATIONS

Akella, S., "Hot Off the Press: the Technology Behind 3d Printing", Mar. 21, 2012. <http://xsrv.mm.cs.sunysb.edu/hon301/showcase/3DPrinting.pdf>.

International Search Report and Written Opinion dated Oct. 22, 2014, PCT Patent Application No. PCT/EP2014/064870 filed Jul. 10, 2014, European Patent Office.

International Search Report and Written Opinion dated Sep. 25, 2014, PCT Patent Application No. PCT/EP2014/050841 filed Jan. 16, 2014, European Patent Office.

Wimpenny, D.I. et al.; "Selective Infrared Sintering of Polymeric Powders using Radiant IR Heating & Ink Jet Printing"; Sep. 14, 2006; 11 pages.

* cited by examiner

GENERATING A THREE-DIMENSIONAL OBJECT

PRIORITY

This application is a Continuation application of U.S. application Ser. No. 15/324,944 filed Jan. 9, 2017, which is a national stage filing under 35 U.S.C. § 371 of PCT application number PCT/EP2014/064870, having an international filing date of Jul. 10, 2014, which claims priority to PCT Application No. PCT/EP2014/050841 filed on Jan. 16, 2014, the disclosures of which are hereby incorporated by reference in their entireties.

BACKGROUND

Additive manufacturing systems enable the generation of three-dimensional objects on a layer-by-layer basis.

The time to produce a three-dimensional object using such systems is related to the speed at which layers of build material may be formed and selectively solidified.

BRIEF DESCRIPTION

Examples will now be described, by way of non-limiting example only, with reference to the accompanying drawings, in which.

Figure 7:
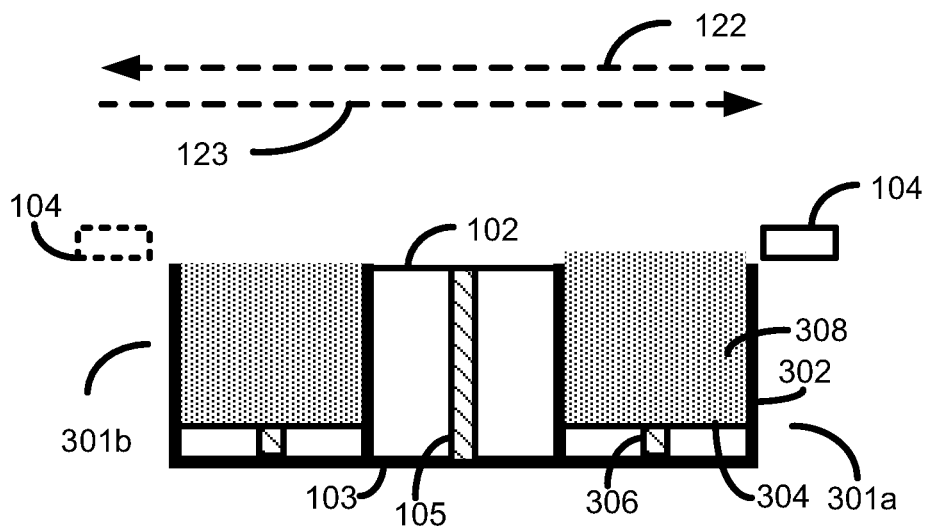
Figure 8:
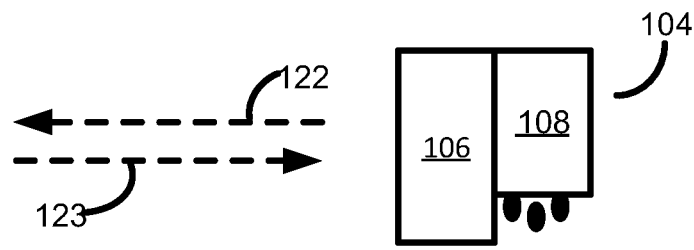
Figure 9:
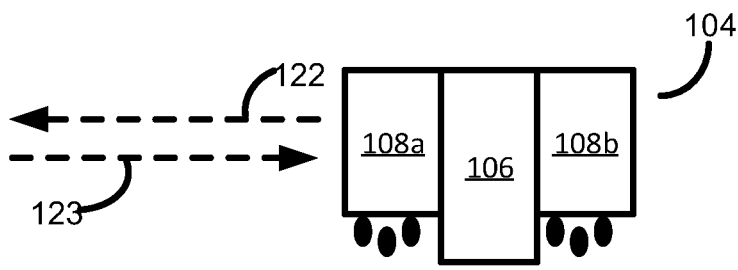

FIGS. 6*a* to 6*d* are side views of carriage arrangements according to various examples;

FIG. 7 is a side view of a portion of an additive manufacturing system according to an example;

FIG. 8 is a side view of a carriage arrangement according to an example; and FIG. 9 is a side view of a carriage arrangement according to an example.

DETAILED DESCRIPTION

Some additive manufacturing systems generate three-dimensional objects through the selective solidification of successive layers of a build material, such as a powdered build material. Some such systems may solidify portions of a build material by selectively depositing an agent to a layer of build material. Some systems, for example, may use a liquid binder agent to chemically solidify build material where the liquid binder agent is applied.

Other systems, for example, may use liquid energy absorbing agents, or coalescing agents, that cause build material to solidify when suitable energy, such as infra-red energy, is applied to build material on which an energy absorbing or coalescing agent has been applied. The temporary application of energy may cause portions of the build material on which coalescing agent has been delivered, or has penetrated, to absorb energy. This in turn causes these portions of build material to heat up above the melting point of the build material and to coalesce. Upon cooling, the portions which have coalesced become solid and form part of the three-dimensional object being generated.

Other systems may use additional agents, such as coalescence modifier agents, in conjunction with coalescing agents. A coalescence modifier agent is agent that serves, for example, to modify the degree of coalescence of a portion of build material on which the coalescence modifier agent has been delivered or has penetrated.

The production of a three-dimensional object through the selective solidification of successive layers of build material may involve a set of defined operations. Generally the defined operations have to be performed sequentially, in a predefined order.

A first process may, for example, be to form a layer of build material from which a layer of the three-dimensional object is to be generated. A subsequent process may be, for example, to selectively deposit one or multiple agents to selected portions of a formed layer of build material. In some examples, a further subsequent process may be to supply energy to build material on which an agent has been deposited to solidify the build material in accordance with where the agent was deposited.

Repetition of these processes enables a three-dimensional object to be generated layer-by-layer, through selective solidification of portions of successive layers of build material.

Generation of three-dimensional objects with an additive manufacturing system may be somewhat time-consuming. Examples described herein, however, provide an additive manufacturing system that enable three-dimensional objects to be produced in a time-efficient manner by providing an additive manufacturing system that may perform different ones of the above-mentioned processes in an efficient manner. For example, in some examples some or all of the processes may be performed at, or substantially at, the same time.

Figure 1:
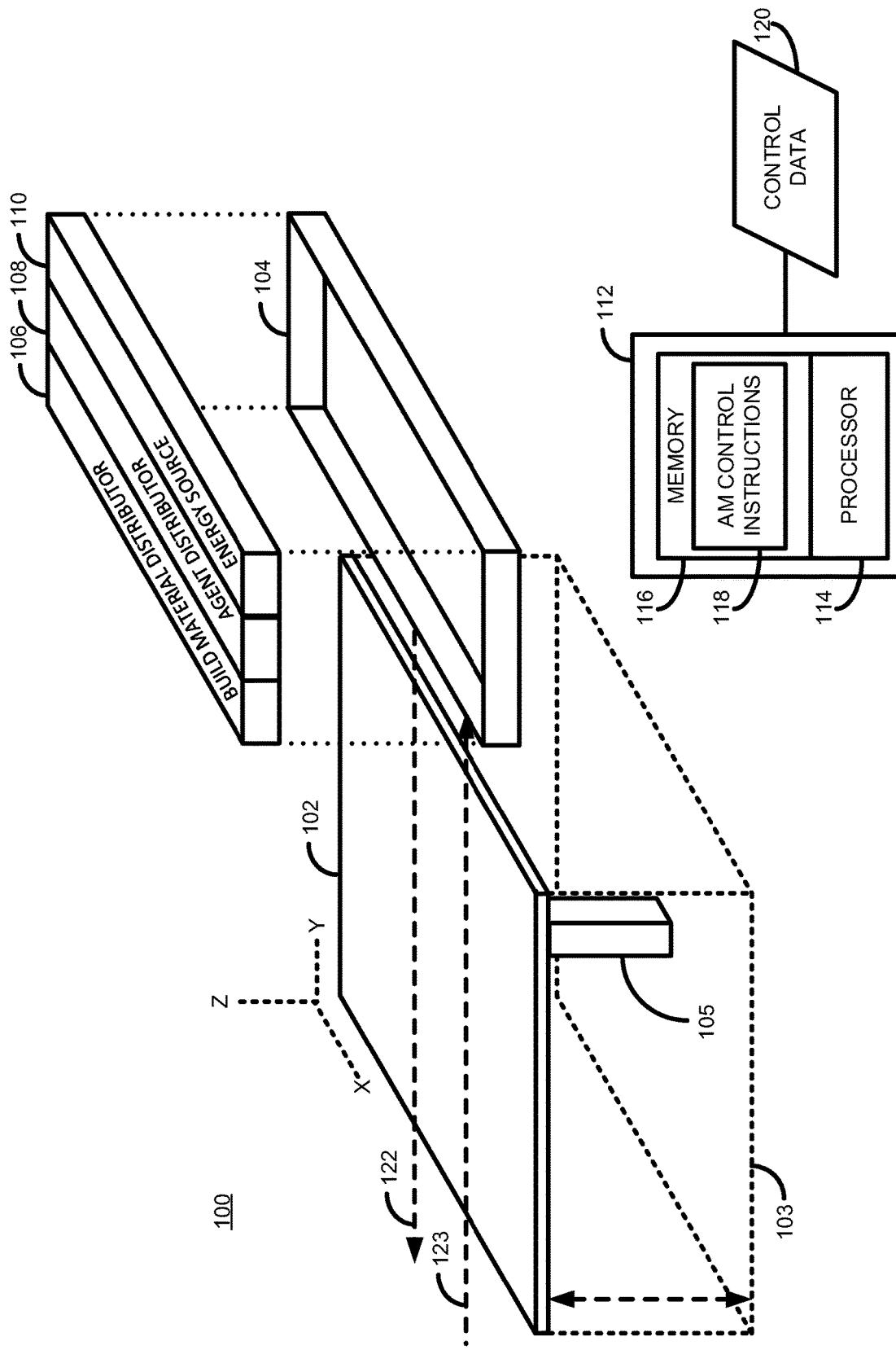
FIG. 1 is an illustration of an additive manufacturing system according to an example.

Referring now to FIG. 1, there is shown a simplified isometric illustration of an additive manufacturing system 100 according to an example.

The system 100 comprises a support platform 102 on which a three-dimensional object may be generated. The system 100 further comprises a carriage 104 that is movable bi-directionally along the y-axis, in a first direction 122 and in a second direction 123, over the support platform 102. In one example the support platform 102 is not moveable, and hence remains static, in the x-axis. In one example the carriage 104 is movable along one or multiple carriage supports (not shown) that may, for example, extend along the y-axis above the support platform 102.

The carriage 104 may have installed thereon, or may receive, multiple modules that may be used during the generation of a three-dimensional object. In the example shown in FIG. 1 three such modules are illustrated: a build material distributor 106; an agent distributor 108; and an energy source 110. In other examples, as described further below, the carriage 104 may have installed thereon, or may receive, additional, fewer, or different modules. For example, if a chemical binder agent is distributed from the agent distributor 108 then in one example no energy source module 110 may be present.

The support platform 102 is mounted on a support element 105, such as a piston, movable in the z-axis, for example such that the support platform 102 may be moved downwards in a stepwise or a continuous motion as each layer of a three-dimensional object is generated. The support platform 102 is surrounded by an open housing 103 (shown in dashed lines). The support platform 102 is movable from a position in which the support platform 102 is generally flush with the uppermost surface of the housing 103, to a position in which the support platform is substantially within the housing 103. The height of the housing 103, and the length of vertical travel of the support platform 102 within the housing generally dictates the maximum height of a three-dimensional object that may be generated with the additive manufacturing system 100.

The operation of the additive manufacturing system 100 is generally controlled by an additive manufacturing system controller 112. The controller 112 comprises a processor 114, such as a microprocessor or microcontroller, coupled to a non-transitory computer readable memory 116, for example through a communications bus (not shown). The memory 116 stores additive manufacturing system control instructions 118 which are machine readable instructions that, when executed by the processor 114, cause the controller 112 to control the additive manufacturing system 100 as described herein in various examples in accordance with control data 120.

The control data 120 is data that may be derived from, for example, a digital model of a three-dimensional object. For example, the control data 120 may define, for each layer of build material to be processed, the locations at which drops of the, or of each agent, are to be deposited.

Figure 2:
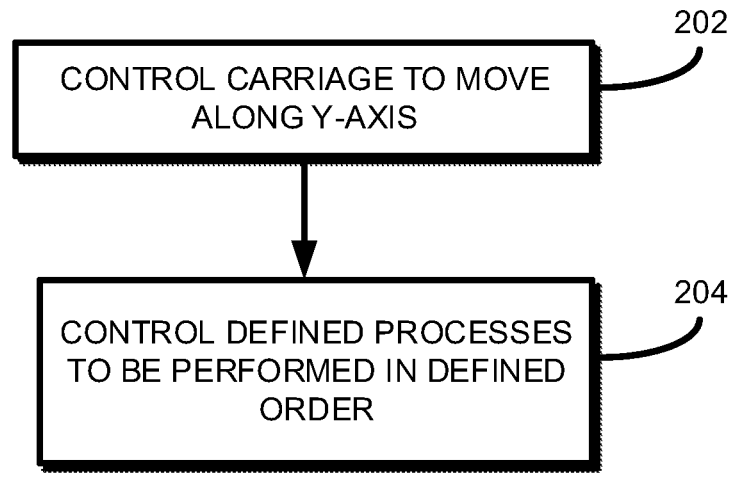
FIG. 2 is a flow diagram outlining a method of operating an additive manufacturing system according to an example.

Operation of the additive manufacturing system 100, according to an example, will now be described with additional reference to the flow diagram of FIG. 2.

In this example, the defined operations to be performed, and the order in which they are to be perform is:

1) Form layer of build material;
2) Deposit agent at selection locations on formed layer of build material; and
3) Apply energy to the formed layer of build material At block 202 the controller 112 controls the carriage 104 to move along the y-axis.

At block 204, as the carriage 104 is moving along the y-axis the controller 112 controls at the modules installed on the carriage 104 to perform the defined operations in the predefined order.

In one example the controller 122 controls all of the defined operations to be performed in the predefined order during a single pass of the carriage 104 over the support 102. For example, as the carriage 104 moves in a first pass in the first direction 122, the controller 112 controls the build material distributor 106 to form a layer of build material on the support 102, controls the agent distributor 108 to deposit drops of an agent at selected locations on the formed layer 404 of build material, and controls the energy source 110 to apply energy 408 to the formed layer 404 on which drops of agent may have been deposited.

In one example the energy source 110 is suitable to apply a substantially uniform amount of energy across a portion of a layer of build material.

In another example, a first sub-set of the set of the defined operations may be performed in a first pass over the support 102, and a second sub-set of the set of operations may be performed in a second pass over the support 102. For example, the controller 112 may control the energy source 110 to operate during a second pass of the carriage over the support 102 in the second direction 123.

The decision to perform all or some of the defined operations in one or in multiple passes may be based on various considerations. For example, one consideration is the way in which the different modules are arranged on the carriage 104. Another consideration may be based on specific details of the additive manufacturing system 100.

For example, the carriage arrangement of FIG. 1 only allows the defined operations to be performed in the predefined order at the same time during a single pass when the carriage is moving in the direction 122. The carriage arrangement of FIG. 1 does, however, also allow the defined operations to be performed in predefined order over multiple passes. For example, the modules 106 and 108 may be operated in a first pass in the first direction 123, and the module 110 may be operated in a second pass in the second direction 123.

Figure 3:
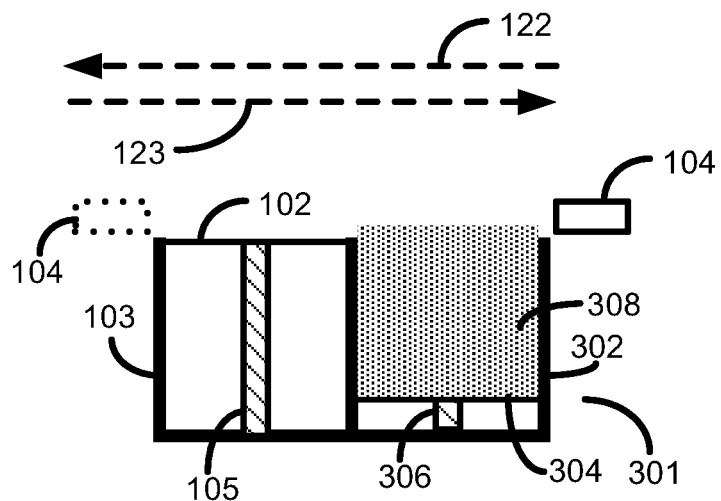
FIG. 3 is a side view of an additive manufacturing system according to an example.

In one example, as illustrated in FIG. 3, the build material distributor 106 comprises a spreader, such as a wiper blade or roller, to spread a volume of build material from a build material store 301 across the support platform 102 to form a layer of build material on the support platform 102.

It should be noted, however, that the first layer of build material is formed directly on the surface of the support platform 102, whereas subsequent layers of build material are formed on a previously formed layer of build material. Accordingly, it will be understood that the notion of 'forming a layer of build material on the support platform', as used herein, may refer to forming an initial layer directly on the support platform 102, or may refer to forming a layer of build material on a previously formed layer of build material, according to the specific context. Similarly, the notion of the 'surface of the support platform', as used herein, is intended to refer either to the top surface of the support platform (when no layer or layers of build material is/are formed thereon), or may refer to the surface of a layer of build material on the support platform, according to the specific context.

In the example shown in FIG. 3 the build material store 301 comprises an open housing 302 within which is provided a movable platform 304 mounted on a moveable element 306 such as a piston. Build material 308 is provided on the platform within the housing 302. When a new layer of build material is to be formed, the movable platform 304 is raised such that a small volume of the build material 308 is raised above the top level of the housing 302. As the carriage 104 is moved in the first direction 122, the raised volume of build material 308 is spread by the build material distributor 106 over the surface of the support platform 102 forming a layer of build material on the support platform 102. The general thickness of the formed layer may depend, for example, on the height difference between the top of the housing 103, and the top of the support element 102 (or the top of any layers of build material formed thereon).

In one example the thickness of the layer of build material formed by the build material distributor 106 may be in the range of about 90 to 110 microns, although in other examples thinner or thicker layers of build material may be provided. The surface of the formed layer of build material is parallel to the y-axis (as shown in FIG. 1), and in an example may be substantially horizontal.

As previously mentioned the build material distributor 106 may form a first layer of build material directly on the support 102, and may form subsequent layers of build material on a previously formed layer of build material. When a new layer of build material is formed atop a previously formed layer of build material the thickness of new layer may vary slightly depending the surface profile of the previously formed layer.

In one example, the build material distributor 106 is a passive element, such that no specific control thereof has to be made. In other words, controlling the carriage 104 to move in the first direction 122 is sufficient to control the build material distributor 106 to form a layer of build material.

In another example, the build material distributor 106 may be an active element. For example it may comprise, or may be coupled to, a build material hopper (not shown) that may be controllable to feed, for example under gravity or under mechanical pressure, a volume of build material in front of the build material distributor 106 as it moves in the first direction 122. In another example the build material distributor 106 may comprise a motorized roller controllable to rotate in a direction counter to the first direction 122 (e.g. the roller may be controller to rotate in a counter-clockwise direction when the carriage is moving in the first direction 122).

Figure 4:
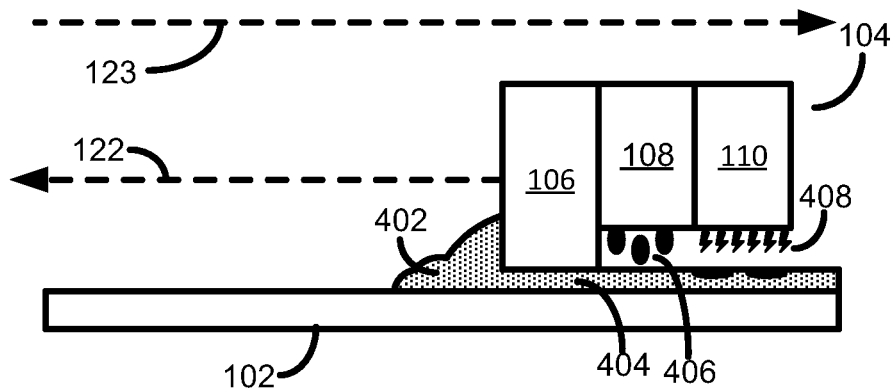
FIG. 4 is a side view of a portion of an additive manufacturing system according to an example.

As shown in FIG. 4, as the carriage 104 is moved in the first direction 122 a substantially level layer 404 of build material is progressively formed by the build material distributor 106. A complete layer of build material is only formed, however, once the carriage 104 has moved completely across the support platform 102.

In one example an agent distributor may be a printhead, such as thermal or a piezo printhead. Such printheads may be the same or similar to those used in inkjet printing systems. In other examples an agent distributor may be a spray nozzle or an array of spray nozzles.

In the example shown in FIG. 1 only a single agent distributor 108 is shown, which may, for example, be used to distribute drops of a suitable binder agent or coalescing agent at selected location on the layer 404. The locations may be selected, for example, based on the control data 120, as previously mentioned. For example, the control data 120 may be based on an image of a slice of a three-dimensional object that is to be generated. In another example, the agent distributor 108 may be configured to deposit drops of multiple agents at selected locations on the layer 404. In an example the agent distributor 108 may selectively deposit drops of a coalescing agent, and may also independently and selectively deposit drops of a coalescence modifier agent on the layer 404.

The energy source 110 may be any suitable energy source for emitting any suitable form of electromagnetic radiation. The type of energy source, and hence the form of electromagnetic radiation emitted thereby may be chosen, for example, based on the type of build material, the type of agent(s), or any appropriate factor. Examples of suitable energy sources may include: ultra-violet light sources; infra-red light sources; visible light sources; microwave energy sources; a heating roller, ultra-sound sources, and laser light sources.

The controller 112 controls the appropriate synchronization of operation of each of the modules installed on the carriage 104. For example, the controller 112 may only control the agent distributor 108 to selectively deposit drops of an agent when the agent distributor 108 is positioned above a section of the formed layer 404 of build material.

Figure 5:
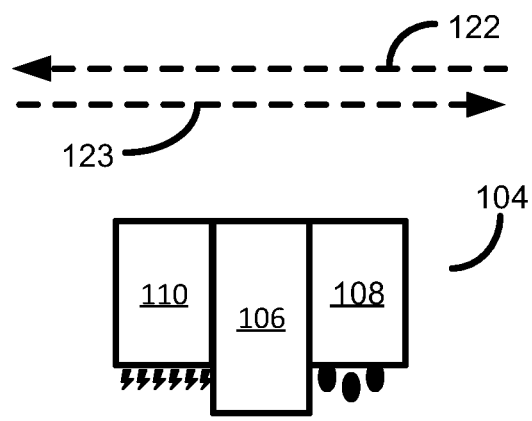
FIG. 5 is a side view of a carriage arrangement according to an example.

The order in which the modules 106, 108 and 110 are arranged in the carriage 104 may be modified in some examples, as illustrated in FIG. 5. For example, in some examples it may be useful to separate the build material distributor 106 from the energy source 110, for example by positioning the build material distributor 106 in between. This, for example, may help shield the build material distributor 106 from energy emitted by the energy source 110.

In the example described above where all of the defined operations are performed during a single pass of the carriage 104, to generate a subsequent layer of a three-dimensional object the carriage 104 has to be moved in the direction 122 back to the right-hand side (as illustrated in FIG. 1) of the support platform 102, during which time the modules 106, 108, and 110 are not operated. In one example, the time when the carriage 104 is returning to the right-hand side of the support platform 102 may be used to perform other operations, which may include, for example; printhead maintenance operations; heating operations; moving the support platform; or the like.

The controller 112 may control the additive manufacturing system 100 to operate in different ways, depending for example, on particular requirements.

In one example, the controller 112 may control the carriage 104 shown in FIG. 5 to move from the right-hand side of the support 102 to the left-hand side of the support 102 in the first direction 122. In a first pass in the direction 122 the controller 112 may control the build material distributor 106 to form a layer of build material, may control the agent distributor 108 to deposit drops of agent at selective locations on the formed layer of build material. The controller 112 may then control the carriage 104 to move in the direction 123 to the right-hand side of the support 102 without the modules 106, 108, or 110 being operated. In subsequent passes in the direction 122, the controller 112 may control the energy source 110 to apply energy to layer of build material formed in the previous pass and on which agent may have been deposited by the agent distributor 108. The controller 112 may then control the build material distributor to form a new layer of build material. The controller 112 may then control the agent distributor to deposit drops of agent at selective locations on the formed layer of build material. This configuration may be useful, for example, where a lapse of time is desired between the depositing of agent onto the layer of build material and the application of energy thereto.

Additional speed advantages may be obtained by enabling a layer of a three-dimensional object to be generated whilst the carriage 104 is moving both in the direction 122 and in the direction 123. Hereinafter this is referred to a bi-directional processing.

To enable bi-directional processing, some of the modules may be installed in duplicate on the carriage 104, as illustrated in FIGS. 6a to 6d. In one example some of the modules may be duplicated and be arranged in a generally symmetrical configuration around a non-duplicated module. In other examples, however, each of the modules may be duplicated. In other examples a non-symmetrical configuration of modules may be provided.

Figure 6A:
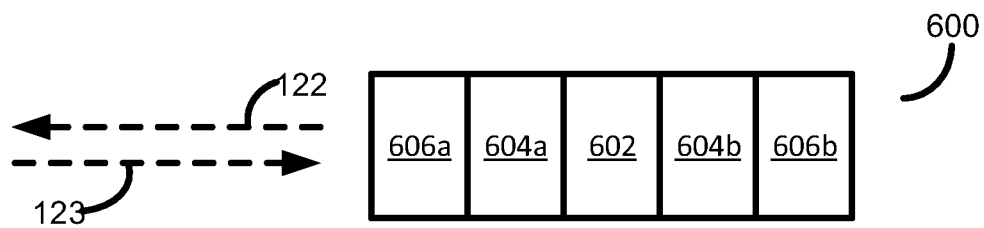

FIG. 6a illustrates a carriage arrangement 600, comprising a number of different modules. Each of the modules is to perform one of the defined operations, for example as described earlier. A single module 602 is provided in the middle of the carriage 600. On each side of the module 602 is provided a respective one of duplicated modules 604a and 604b. At each extremity of the carriage 600 is a respective one of duplicated modules 606a and 606b.

During operation, the controller 112 controls the non-duplicated module 602 to operate whilst the carriage is moving in both the direction 122 and in the direction 123. The controller 112 controls one pair of each of the duplicated modules to operate whilst the carriage is moving in the direction 122, and controls the other one of the pair of each of the duplicated modules to operate whilst the carriage is moving the direction 123.

For example, in a first pass in the direction 122 the controller 112 controls the modules 602, 604b, and 606b to operate, and in a second pass in the direction 123 the controller 112 controls the modules 602, 604a, and 606a to operate. Thus, the controller 112 may control different ones of the modules on the carriage 104 to operate depending on the direction in which the carriage 104 is moving.

In this way, all of the defined operations may be performed in the predefined order whilst the carriage is moving in either the first direction 122 or in the second direction 123.

Some specific examples are additionally shown in FIGS. 6b to 6e. It will be understood, however, that the examples described herein are purely illustrative in nature and are in no way limiting. For example, other configurations and arrangements of modules may be possible that allow each of the different processes to be performed in the predefined order.

Figure 6B:
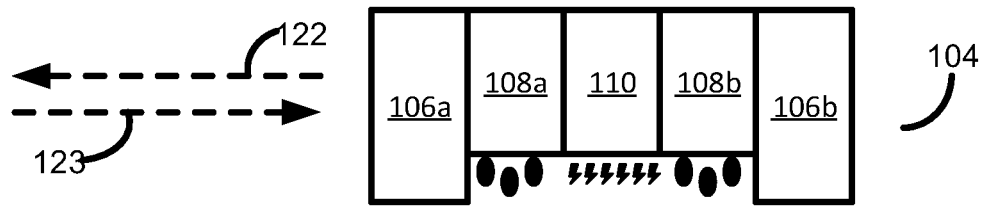

Referring now to FIG. 6b, there is a shown an example carriage arrangement, in which a single energy source 110 is provided between a pair of agent distributors 108a and 108b. At the extremity of the carriage is provided one of pair of build material distributors 106a and 106b. In operation, the controller 112 controls the carriage to move from the right-hand side of the support 102 to the left-hand side of the support 102 in the first direction 122. In a first pass in the direction 122 the controller 112 may control the build material distributor 106a to form a layer of build material, may control the agent distributor 108a to deposit drops of agent at selective locations on the formed layer of build material, and may control the energy source 110 to apply energy to the layer of build material. In a return pass in the direction 123, the controller 112 may control the build material distributor 106b to form a layer of build material, may control the agent distributor 108b to deposit drops of agent at selective locations on the formed layer of build material, and may control the energy source 110 to apply energy to the layer of build material.

Figure 6C:
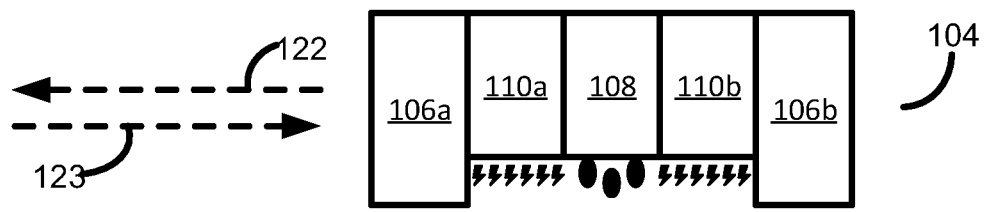

Referring now to FIG. 6c, there is a shown an example carriage arrangement, in which a single agent distributor 108 is provided between a pair of energy sources 110a and 110b. At the extremity of the carriage is provided one of a pair of build material distributors 106a and 106b. In operation, the controller 112 controls the carriage to move from the right-hand side of the support 102 to the left-hand side of the support 102 in the first direction 122. In a first pass in the direction 122 the controller 112 may control the build material distributor 106a to form a layer of build material, may control the agent distributor 108 to deposit drops of agent at selective locations on the formed layer of build material, and may control the energy source 110b to apply energy thereto. In a return pass in the direction 123, the controller 112 may control the build material distributor 106b to form a layer of build material, may control the agent distributor 108 to deposit drops of agent at selective locations on the formed layer of build material, and may control the energy source 110a to apply energy thereto. In one example, the energy sources 110a and 110b may be operated at different energy intensities or wavelengths during each pass, for example, such that one energy source may be used as a pre-heater whilst the other energy source is apply energy suitable to cause solidification of build material on which an appropriate agent has been deposited.

In some examples an agent distributor, such as the agent distributor 108a or 108b, may be able to selectively and independently deposit drops of multiple agents, such as drops of a coalescing agent and a coalescence modifier agent.

Figure 6D:
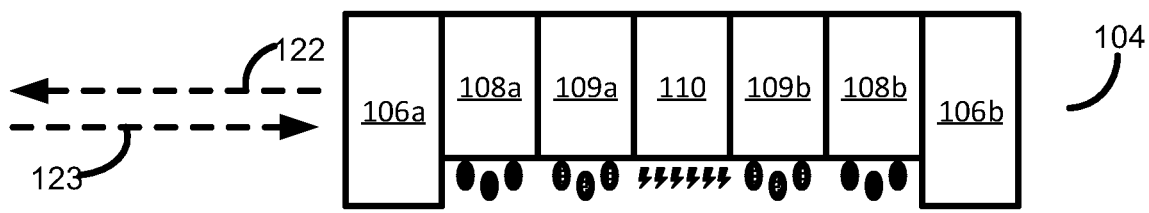

Referring now to FIG. 6d, there is a shown an example carriage arrangement, in which a two pairs of agent distributors 108a and 108b, and 109a and 109b, are provided between a single energy source 110. The first pair of agent distributors 108a and 108b may deposit drops of a first agent, such as a coalescing agent. The second pair of agent distributors 109a and 109b may deposit drops of a second agent, such as a coalescence modifier agent. At the extremity of the carriage is provided one of a pair of build material distributors 106a and 106b. In operation, the controller 112 controls the carriage to move from the right-hand side of the support 102 to the left-hand side of the support 102 in the first direction 122. In a first pass in the direction 122 the controller 112 may control the build material distributor 106a to form a layer of build material, may control the agent distributor 108a to deposit drops of a first agent at selective locations on the formed layer of build material, may control the agent distributor 109a to deposit drops of a second agent at selective locations on the formed layer of build material, and may control the energy source 110 to apply energy to the layer of build material. In a return pass in the direction 123, the controller 112 may control the build material distributor 106b to form a layer of build material, may control the agent distributor 108b to deposit drops of a first agent at selective locations on the formed layer of build material, may control the agent distributor 109b to deposit drops of a second agent at selective locations on the formed layer of build material, and may control the energy source 110a to apply energy to the layer of build material.

In one example, to enable bi-directional distribution of build material the additive manufacturing system 100 may be provided with a pair of build material stores 301a and 301b, as illustrated in FIG. 7. For example, when the carriage 104 moves in the first direction 122, build material from the build material store 301a is used to form a layer of build material on the support platform 102, and when the carriage 104 moves in the direction 123, build material from the build material store 301b is used to form a layer of build material on the support platform 102.

As previously mentioned, in an example where a chemical binder agent is distributed from the agent distributor 108 no energy source module 110 may be present on the carriage 104, as illustrated in FIG. 8. In this example the carriage 104 may comprise a build material distributor module 106 and an agent distributor 108. In one example such a carriage may be controlled to generate a layer of a three-dimensional object in a single pass whilst moving in a single direction, such as the direction 122. During a return pass the agent distributor 108 and build material distributor 106 are not operated.

In one example such a carriage may be controlled to generate a layer of three-dimensional object over two passes, for example a first pass in the direction 122 the build material distributor 106 may be operated, and in a second pass in the direction 123 the agent distributor 106 may be operated. In another example more than two passes may be used.

In a further example, as illustrated in FIG. 9, the carriage 104 may be arranged to comprise a build material distributor 106 on either side of which is arranged one of a pair of agent distributors 108a and 108b. This configuration enables, for example, a layer of a three-dimensional object to be generated whilst the carriage 104 is moving either in a direction 122 or in a direction 123.

The example additive manufacturing systems described herein provide a scalable solution for additive manufacturing systems. For example, by having all of the main modules of an additive manufacturing system positioned on a single carriage enables all data, power, and agent connections to be routed to a single carriage. This may help simplify the design and manufacture of such systems. Furthermore, the size of objects that may be generated with such a system may be easily increased in the y-axis by extending the length of the support platform 102 and extending the length of the carriage bars on which the carriage 104 moves.

Although the examples described herein provide a carriage which moves over a fixed support platform, in other examples the carriage 104 may be fixed and the support platform 102 may be movable along the y-axis. In other examples, any suitable relative movement between the carriage 104 and the support platform 102 may be provided.

Description of Materials

To enable the methods and systems to manufacture a three-dimension object as described herein to function the properties of the build material, coalescing agent, and coalesce modifier agent need to be carefully chosen.

Some examples of suitable materials are given below.

Build Material

According to one example a suitable build material may be a powdered semi-crystalline thermoplastic material. One suitable material may be Nylon 12, which is available, for example, from Sigma-Aldrich Co. LLC. Another suitable material may be PA 2200 which is available from Electro Optical Systems EOS GmbH.

In other examples any other suitable build material may be used. Such materials may include, for example, powdered metal materials, powdered composited materials, powder ceramic materials, powdered glass materials, powdered resin material, powdered polymer materials, and the like.

Coalescing Agent

According to one non-limiting example, a suitable coalescing agent may be an ink-type formulation comprising carbon black, such as, for example, the ink formulation commercially known as CM997A available from Hewlett-Packard Company. In one example such an ink may additionally comprise an infra-red light absorber. In one example such an ink may additionally comprise a near infra-red light absorber. In one example such an ink may additionally comprise a visible light absorber. Examples of inks comprising visible light enhancers are dye-based colored ink and pigment-based colored ink, such as inks commercially known as CE039A and CE042A available from Hewlett-Packard Company.

Coalescence Modifier Agent

As described above, a coalescence modifier agent acts to modify the effects of a coalescing agent. It has been demonstrated that different physical and/or chemical effects may be used to modify the effects of a coalescing agent.

For example, and without being bound by any theory, in one example a coalescence modifier agent may act to produce a mechanical separation between individual particles of a build material, for example to prevent such particles from joining together and hence preventing them from solidifying to form a portion of a generated three-dimensional object. An example coalescence modifier agent may comprise a liquid that comprises solids. Such an agent may be, for example, a colloidal ink, a dye-based ink, or a polymer-based ink.

Such an agent may, after being delivered to a layer of build material, cause a thin layer of solids to cover or partially cover a portion of build material, for example after evaporation of any carrier liquid, and hence may act as a coalescence modifier agent as described herein.

In one example such a coalescence modifier agent may comprise solid particles that have an average size less than the average size of particles of the build material on which it is to be delivered. Furthermore, the molecular mass of the coalescence modifier agent and its surface tension should be such that it enables the coalescence modifier agent it to penetrate sufficiently into the build material. In one example such an agent should also have a high solubility such that each drop of agent comprises a high percentage of solids.

In one example a salt solution may be used as a coalescence modifier agent.

In another example an ink commercially known as CM996A ink and available from Hewlett-Packard Company may be used as a coalescence modifier agent. In another example an ink commercially known as CN673A ink and available from Hewlett-Packard Company has also been demonstrated to work as a coalescence modifier agent.

In another example, and without being bound by any theory, a coalescence modifier agent may act to modify the effects of a coalescing agent by preventing build material from reaching temperatures above its melting point. For example, it has been demonstrated that a fluid that exhibits a suitable cooling effect may be used as a coalescence modifier agent. For example, when such an agent is delivered to build material the energy applied to the build material may be absorbed by the coalescence modifier agent causing the evaporation thereof, which may help prevent build material on which the coalescence modifier agent has been delivered or has penetrated from reaching the melting point of the build material.

In one example an agent comprising a high percentage of water has been demonstrated as a suitable coalescence modifier agent.

In other examples other types of coalescence modifier agent may be used.

An example of a coalescence modifier agent that may increase the degree of coalescence may include, for example a suitable plasticizer. Another example of a coalescence modifier agent that may increase the degree of coalescence may include, for example, a surface tension modifier to increase the wettability of particles of build material.

It will be appreciated that examples described herein can be realized in the form of hardware, or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are example of machine-readable storage that are suitable for storing a program or programs that, when executed, implement examples described herein. Accordingly, examples provide a program comprising code for implementing a system or method as claimed in any preceding claim and a machine readable storage storing such a program.

The invention claimed is:

1. A system comprising:
   a carriage to move bi-directionally along a first axis relative to a platform, the carriage having a first end and a second end;
   an energy source supported by the carriage at a location between the first end and the second end;
   a first agent distributor supported by the carriage at a location between the first end and the energy source, the first agent distributor containing a coalescing or binder agent;

a third agent distributor supported by the carriage at a location between the first agent distributor and the energy source, the third agent distributor containing a coalescence modifier agent;

a second agent distributor supported by the carriage at a location between the energy source and the second end, the second agent distributor containing the coalescing or binder agent;

a fourth agent distributor supported by the carriage at a location between the energy source and the second agent distributor, the fourth agent distributor containing the coalescence modifier agent;

a first build material distributor supported by the carriage at a location between the first agent distributor and the first end;

a second build material distributor supported by the carriage at a location between the second agent distributor and the second end; and a controller to:
control the first build material distributor to form a layer of build material and to selectively control the first agent distributor, the third agent distributor, and the energy source to perform operations to deposit coalescing or binder agent and coalescence modifier agent and apply energy to the layer of build material in a predefined order during movement of the carriage in a first direction; and control the second build material distributor to form a second layer of build material and to selectively control the second agent distributor, the fourth agent distributor, and the energy source to perform operations to deposit coalescing or binder agent and coalescence modifier agent and apply energy to the second layer of build material in the predefined order during movement of the carriage in a second direction;

wherein the first agent distributor and the second agent distributor deposit the coalescing agent or the binder agent onto selected areas of the layers of build material that are to form sections of a three-dimensional (3D) object and the third agent distributor and the fourth agent distributor deposit the coalescence modifier agent onto locations outside of the selected areas that are to form the sections of the 3D object.

2. The system of claim 1, wherein the first end is diametrically opposed to the second end along a direction that is parallel to the first axis.

3. The system of claim 1, wherein the build material is a powdered metal material.

4. The system of claim 1, further comprising:
a build material hopper to supply build material for distribution by at least one of the first build material distributor or the second build material distributor; and a controller to:
control a supply of a volume of the build material for the first build material distributor in front of the first build material distributor along the first direction; and control a supply of a volume of the build material for the second build material distributor in front of the second build material distributor along the second direction.

5. The system of claim 1, wherein the controller is further to:
control the carriage to move in the first direction along the first axis relative to the platform, wherein the first end of the carriage is the leading edge when the carriage moves in the first direction.

6. The system of claim 5, wherein the controller is further to:
control the carriage to move in the second direction opposite the first direction along the first axis relative to the platform.

7. The system of claim 6, wherein the controller is to:
control the energy source to apply energy onto the layers of build material.

8. The system of claim 7, wherein the controller is further to:
selectively activate the second agent distributor during movement of the carriage in the first direction.

9. A method comprising:
controlling a carriage to move in a first direction along a first axis relative to a platform;

controlling, during movement of the carriage in the first direction:
a first build material distributor to distribute build material into a first layer;
a first agent distributor to distribute droplets of a binder agent onto selected areas of the first layer of build material;
a third agent distributor to distribute droplets of a coalescence modifier agent onto locations of the first layer of build material outside of the selected areas; and
a first energy source to apply energy onto the first layer of build material, wherein the binder agent, the coalescence modifier, and the energy are distributed and applied in a predefined order during movement of the carriage in the first direction;

following movement of the carriage in the first direction, controlling the carriage to move in a second direction along the first axis relative to the platform;

controlling, during movement of the carriage in the second direction:
a second build material distributor to distribute build material into a second layer over the first layer;
a second agent distributor to distribute droplets of the binder agent onto selected areas of the second layer of build material;
a fourth agent distributor to distribute droplets of the coalescence modifier agent onto locations of the second layer of build material outside of the selected areas of the second layer of build material; and
a second energy source to apply energy onto the second layer of build material, wherein the binder agent, the coalescence modifier, and the energy are distributed and applied in the predefined order during movement of the carriage in the second direction.

10. The method of claim 9, further comprising:
controlling a supply of a volume of the build material for the first build material distributor to distribute into the first layer; and
controlling a supply of a volume of the build material for the second build material distributor to distribute into the second layer.

11. The method of claim 10, wherein controlling the supply of a volume of the build material for the first build material distributor further comprises controlling the supply of a volume of the build material in front of the first build material distributor along the first direction and wherein controlling the supply of a volume of the build material for the second build material distributor further comprises controlling the supply of a volume of the build material in front of the second build material distributor along the second direction.

12. The method of claim 9, wherein controlling the first build material distributor further comprises controlling the first build material distributor to rotate in a direction counter to the first direction and wherein controlling the second build material distributor further comprises controlling the second build material distributor to rotate in a direction counter to the second direction.

13. A three-dimensional (3D) object generating system comprising:
  a carriage having a first end and a second end, the carriage supporting:
    an energy source;
    a first build material distributor positioned at the first end of the carriage;
    a second build material distributor positioned at the second end of the carriage;
    a first agent distributor positioned between the energy source and the first build material distributor, the first agent distributor containing a coalescing agent or a binder agent;
    a second agent distributor positioned between the first agent distributor and the energy source, the second agent distributor containing a coalescence modifier agent;
    a third agent distributor positioned between the energy source and the second build material distributor, the third agent distributor containing the coalescence modifier agent;
    a fourth agent distributor positioned between the third agent distributor and the second material distributor, the fourth agent distributor containing the coalescing agent or the binder agent; and
  a controller to:
    control the carriage to move bi-directionally along a first axis relative to a platform;
    control the first build material distributor to form a first layer of build material, the first agent distributor to deposit the coalescing agent or the binder agent onto selected areas on the first layer of build material, the second agent distributor to deposit the coalescence modifier agent onto locations outside of the selected areas, and the energy source to apply energy to the build material in a predefined order during movement of the carriage in the first direction in which the first end is the leading edge, the deposited coalescing agent or the binder agent, and the deposited coalescence modifier to form a first section of the 3D object in the first layer of build material; and
    control the second build material distributor to form a second layer of build material, the fourth agent distributor to deposit the coalescing agent or the binder agent onto selected areas on the second layer of build material to form a second section of the 3D object, the third agent distributor to deposit the coalescence modifier agent onto locations outside of the selected areas on the second layer, and the energy source to apply energy to the build material in the predefined order during movement of the carriage in a second direction in which the second end is the leading edge, the deposited coalescing agent or the binder agent, and the deposited coalescence modifier to form a second section of the 3D object in the second layer of build material, wherein the deposited coalescence modifier agent is to prevent particles of build material upon which the coalescence modifier agent is deposited or has penetrated from solidifying during application of energy by the energy source onto the particles of build material.

14. The three-dimensional object generating system of claim 13, wherein the second agent distributor is to distribute an agent that differs from an agent that the first agent distributor is to distribute.

15. The three-dimensional object generating system of claim 13, further comprising:
  a build material hopper to supply build material for distribution by at least one of the first build material distributor or the second build material distributor.

16. The three-dimensional object generating system of claim 13, wherein the first agent distributor is rotatable and the second agent distributor is rotatable and wherein the controller is to:
  control the first build material distributor and the second build material distributor to rotate in a direction counter to the direction in which the carriage is moving during formation of the respective layers of build material.

17. A system comprising:
  a carriage to move bi-directionally along a first axis relative to a platform, the carriage having a first end and a second end;
  an energy source supported by the carriage;
  a first binder agent distributor containing a binder agent;
  a first coalescence modifier agent distributor containing a coalescence modifier agent;
  a first build material distributor, the first binder agent distributor, the first coalescence modifier agent distributor, and the first build material distributor supported by the carriage at locations between the energy source and the first end;
  a controller to control the first build material distributor to form a first layer of build material, to control the first binder agent distributor to deposit the binder agent onto selected areas on the first layer to form a first section of a three-dimensional (3D) object, to control the first coalescence modifier agent distributor to deposit coalescence modifier agent onto locations outside of the selected areas, and to control the energy source in a predefined order as the carriage is moved along a first direction;
  a second binder agent distributor containing the binder agent;
  a second coalescence modifier agent distributor containing the coalescence modifier agent;
  a second build material distributor, the second binder agent distributor, the second coalescence modifier agent distributor, and the second build material distributor supported by the carriage at locations between the energy source and the second end; and
  wherein the controller is further to control the second build material distributor to form a second layer of build material, to control the second binder agent distributor to deposit the binder agent onto selected areas on the second layer to form a second section of the 3D object, to control the second coalescence modifier agent distributor to deposit the coalescence modifier agent onto locations outside of the selected areas on the second layer, and to control the energy source in the predefined order as the carriage is moved along a second direction, wherein the deposited coalescence modifier agent is to prevent particles of build material upon which the coalescence modifier agent is deposited or has penetrated from solidifying during application of energy by the energy source onto the particles of build material.

18. The system of claim 17, wherein the deposited coalescence modifier agent is to prevent particles of the build material outside of the first section and the second section of the 3D object from joining with the particles inside the first section and the second section.

19. The system of claim 1, wherein the deposited coalescence modifier agent is to prevent particles of build material upon which the coalescence modifier agent is deposited or has penetrated from solidifying during application of energy by the energy source onto the particles of build material.

\* \* \* \* \*